April 8, 1941.  E. HIGGINS  2,237,430
MOTOR AND PUMP TRANSMISSION
Filed July 7, 1939  2 Sheets-Sheet 1
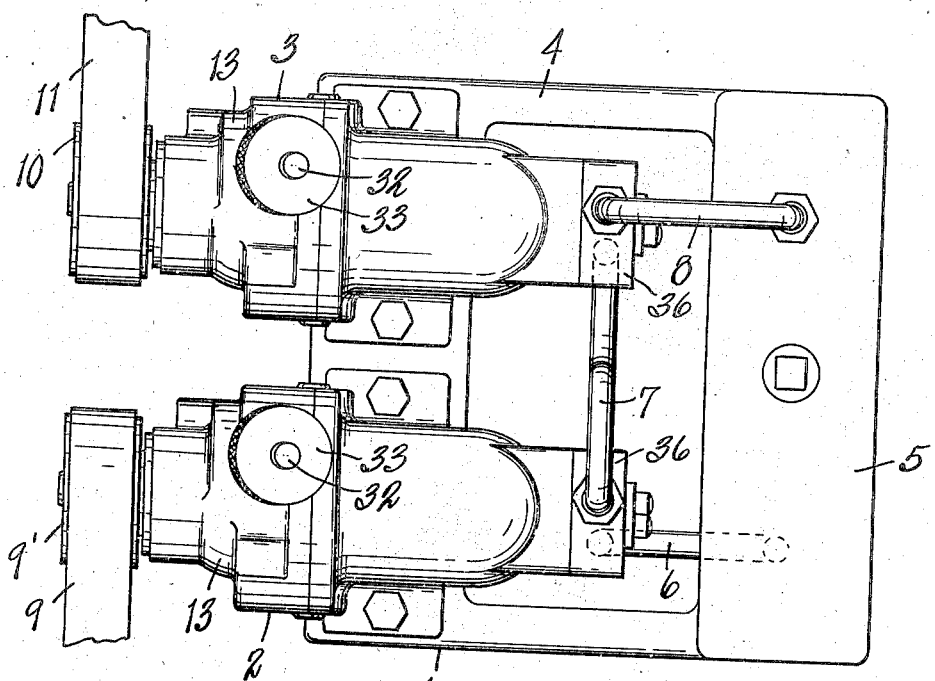
Fig. 1.
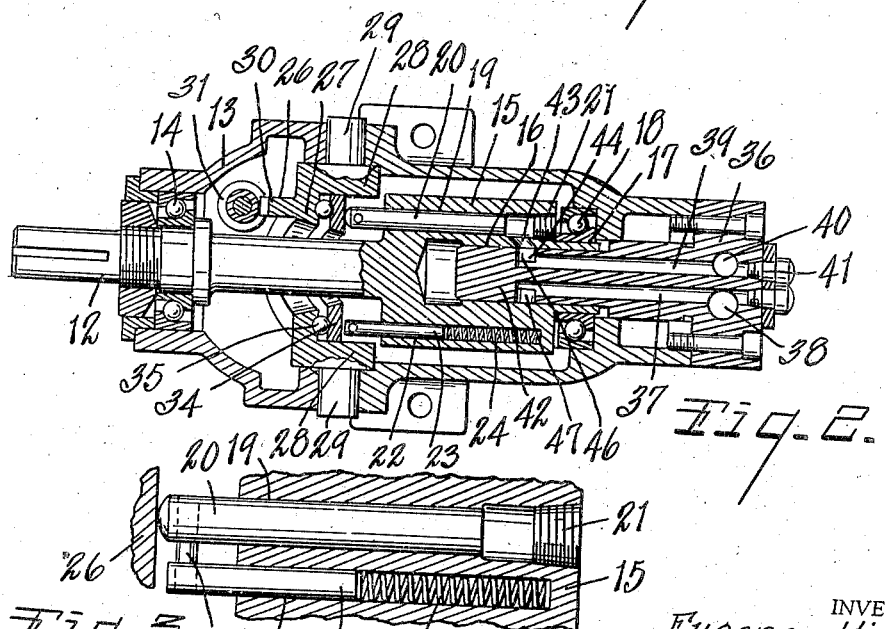
Fig. 2.
Fig. 3.
INVENTOR.
Eugene Higgins
BY Earl & Chappell
ATTORNEYS Patented Apr. 8, 1941

2,237,430

UNITED STATES PATENT OFFICE 2,237,430

MOTOR AND PUMP TRANSMISSION

Eugene Higgins, Jackson, Mich.

Application July 7, 1939, Serial No. 283,146

4 Claims. (Cl. 103—162)

This invention relates to improvements in motor and pump transmissions.

The main objects of this invention are:

First, to provide a hydraulic variable speed transmission.

Second, to provide a transmission assembly of the type described including a motor and pump of similar or identical construction having means for affording any desired speed of operation within a wide range.

Third, to provide a transmission of the type described including a motor and pump having a minimum of moving parts and a simplified arrangement for varying the speed of operation thereof.

Fourth, to provide a hydraulic transmission including a pump or motor of the rotary type having axially acting rotatively transported plungers actuated by or acting on an operating fluid, as the case may be.

Fifth, to provide a hydraulic pump or motor which is exceedingly compact and simple in its parts, which is valveless, and which enables a choice of operating speeds throughout a wide range.

Sixth, to provide a pump or motor of the type described wherein, in the case of a motor, the same is capable of smooth rapid stepless acceleration through a wide range of speeds, and in the case of a pump, in which the capacity may be smoothly varied as desired.

Seventh, to provide an assembly including a motor and pump having the foregoing characteristics and constituting a transmission assembly of highly simplified and standardized construction.

Objects relating to details and economies of the invention will appear from the description to follow. The invention is defined in the claims.

A structure embodying the features of the invention is illustrated in the accompanying drawings, wherein:

Fig. 1 is a plan view illustrating the transmission assembly of the invention with driving and power takeoff belts therefor.

Fig. 2 is a view partially broken away and in horizontal longitudinal section illustrating details of construction of the pump or motor of the invention, these details in the preferred embodiment being of identical design for both a pump and motor.

Fig. 3 is an enlarged fragmentary view in section illustrating a detail of the plunger and plunger return mechanism of the invention.

Figure 4:
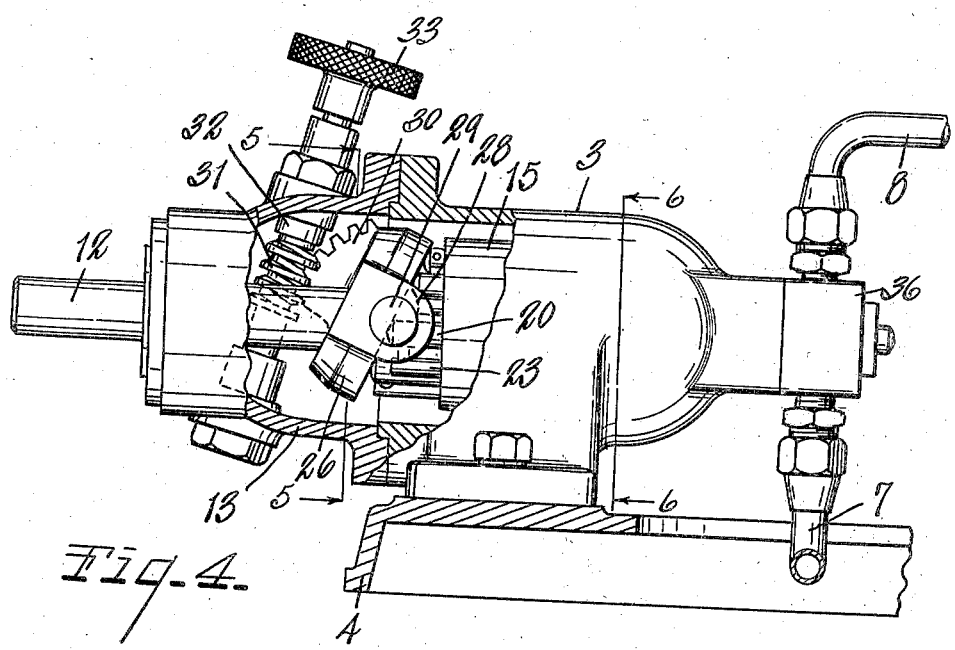
Fig. 4 is a view in side elevation partially broken away and in section on line 4—4 of Fig. 5, illustrating the motor of the transmission of the invention and details of the speed adjusting mechanism therefor.

The present invention relates to a variable speed hydraulic transmission in general and more particularly to a transmission of the type described including a driven pump and a motor actuated thereby of which the details of construction are substantially identical, so that the cost of manufacturing the assembly is reduced to a minimum. This factor, i. e., cost, is also effected by the fact that the pump and motor of my assembly are both of highly simplified construction, each involving a minimum of moving parts and only one rotating part. Invention further resides in the device in the employment of a plurality of axially arranged and acting plungers provided with a novel spring return mechanism for maintaining the plungers in engagement with a relatively fixed though readily adjustable inclined cam surface whereby, in the case of the pump, the plungers are actuated longitudinally and, in the case of the motor, a barrel by which the plungers are carried is caused to revolve, in turn rotating the power output shaft to which the barrel is drivingly connected.

Referring to the drawings, the reference numeral 1 in general indicates the variable speed transmission assembly of the invention which consists of a pump 2 and a hydraulic motor 3 which are preferably of identical construction and are mounted on a base 4 provided with a combined operating fluid supply tank and sump 5.

The pump has a feed line 6 connected thereto through which operating fluid is fed by gravity from the tank 5 to the pump intake while a pipe 7 communicates the discharge of the pump 2 with the intake of the motor 3. A further fluid return pipe 8 connects the fluid discharge or exhaust of the motor to the tank 5.

Inasmuch as the pump and motor are preferably of identical construction, a description of one thereof will suffice for the other, it being understood, however, that the operations of the two are reversed, the shaft of the pump being rotated by a belt 9 trained around a pulley 9' thereof and driven by a suitable prime mover to actuate the pump, whereas a power output pulley 10 and output belt 11 are driven by the shaft of the motor. The pump is actuated by pulley 9' to withdraw operating fluid from tank 5 through pipe 6 and discharges through pipe 7 to the motor 3, the fluid under pressure serving to actuate the shaft of the motor and the output pulley 10 after which it is returned through pipe 8 to the tank. The pump may be used to deliver fluid to some other driven element or unit.

The pump (or motor) has a shaft 12 keyed at its outer end to receive its pulley and journaled at one end in a casing or housing 13 by means of a ball bearing 14. This shaft has formed integrally thereon and preferably therewith an enlarged axial barrel or cylinder block 15 which has an axial central bore 16 of relatively large diameter. The barrel is reduced in external diameter at the end 17 thereof opposite the bearing 14 at which location it is further journaled in the housing 13 by means of a roller bearing 18. The barrel has a plurality of parallel axially extending elongated bores 19 formed thereon and serving as cylinders for the plungers or pistons 20, the ends of the cylinders being provided with end closures at 21. These cylinders 19 formed in the barrel are spaced equally circumferentially thereof, seven being shown in the preferred embodiment, see Fig. 6. Adjacent each of the cylinders I provide a relatively small longitudinally extending guide bore or recess 22 in which is disposed an axially sliding pin 23 under the influence of a coil spring 24 disposed in the recess. As illustrated in Fig. 3, the pin 23 and plunger 20 are coupled together by a yoke pin 25, so as to move axially in either direction as a unit, the coil spring 24 serving to maintain the plunger in operative engagement with an inclined cam mechanism which is generally designated by the reference numeral 26.

This inclined cam mechanism is clearly illustrated in Figs. 2 and 4 and consists of a normally fixed circular cam or track 27 having integral ears 28 at diametrically opposite points and radial trunnions 29 integral with the ears rotatably mounted in diametrically opposed bearings provided therefor in the casing or housing 13. The cam mechanism has formed integrally therewith a rearwardly extending gear segment 30 which segment is engaged and actuated by a worm 31 on an adjusting shaft 32 appropriately journaled in the housing 13. Shaft 32 carries a knurled adjusting wheel 33 externally of the housing for manual adjustment by the operator.

It will be apparent that manipulation of the hand wheel 33 alters the angle of inclination of the cam track 27 relative to the axis of the pump or motor shaft 12 and accordingly varies the length of the stroke of the plungers 20 actuated thereby so that the volumetric displacement of the pump (or the speed of the motor) may be readily and steplessly varied within wide limits. The cam mechanism 26 is completed by an annular thrust plate 34 surrounding the shaft and against which the axial plungers 20 bear axially. A series of balls 35 interposed between the fixed cam face or track 27 and thrust plate and disposed in a suitable race provided by these elements enables the latter to rotate frictionlessly relative to the fixed face member as the barrel 15 and plungers carried thereby are caused to rotate.

In order to supply and discharge operating fluid to and from the pump cylinders 19, I provide a liquid passage head 36 which is bolted to the extreme right hand end of the housing 13 as viewed in Fig. 2, this member being preferably in the form of a casing cored out to provide an axial intake or feed passage 37 communicating with an intake opening 38 to which pipe 6 is connected and a discharge passage 39 communicating with a discharge opening 40 to which discharge pipe 7 is connected. These passages are plugged at their ends as indicated by the reference numeral 41. I have stated that openings 38, 40 are connected respectively to the feed and discharge pipes 6, 7. This is the proper connection for the pump 2, although it is evident that in the case of the motor 3 the corresponding openings 38, 40 are connected respectively to the pump discharge pipe 7 and return or exhaust pipe 8.

Figures 5, 6:
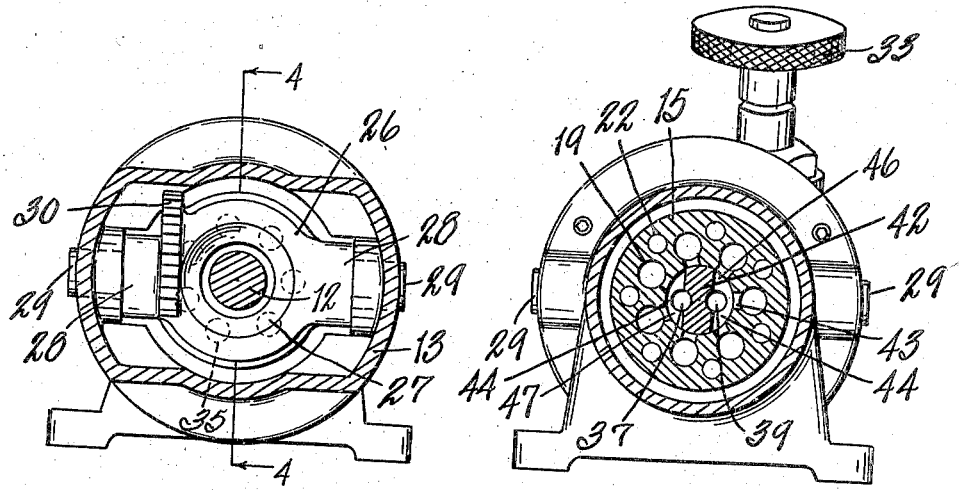
Fig. 5 is a view in transverse section on line 5—5 of Fig. 4, further illustrating the speed control of the invention.
Fig. 6 is a view in section on line 6—6 of Fig. 4, illustrating the arrangement of cylinders in the rotary barrel or cylinder block of the motor or pump in accordance with the invention.

The fixed fluid passage head 36 has an axial substantially cylindrical extension 42 extending interiorly of the central bore 16 in the barrel 15. The barrel bore and extension have a substantially liquid tight sliding fit though no appreciable harm is done even if a perfect liquid seal is not had at this point. Each of the cylinders 19 has a combined intake and discharge port 43 which communicates radially with the barrel bore 16 and, as illustrated in Figs. 2 and 6, the extension 42 is cut away at its sides immediately adjacent ports 43, as indicated by the reference numeral 44, to provide intake and discharge chambers 46, 47 respectively on either side of the extension. As viewed in Fig. 6, there are a plurality of cylinders 19 communicating at all times with the intake chamber 46 and likewise a plurality of the cylinders communicating with the discharge chamber 47 as the barrel 15 rotates around the extension 42.

In operation, assuming the cam face 27 and thrust ring 34 to be set at a desired angle relative to the shaft 12 by manipulation of hand wheel 33 and assuming that the pump shaft is actuated by belt 8, the rotation of the barrel results in axial actuation of the plungers 20 in cylinders 19, those communicating with the feed or intake chamber 46 and intake passage 37 being actuated to the left as viewed in Figs. 2 and 3 by means of coil springs 22 to draw a charge of the operating liquid into their respective cylinders, while those in communication with the discharge chamber 47 and passage 39 are actuated by the cam to the right as viewed in Figs. 2 and 3 to expel the liquid under pressure through discharge pipe 7. Assuming a pump and motor constructed as described above to be assembled in the manner illustrated in Fig. 1, the fluid under pressure entering the motor intake passage 46 causes plungers 20 to engage the thrust ring 34 and through the latter and balls 35 the cam face 27, thereby exerting a component of force on the latter which, since the cam face 27 is fixed, results in rotation of plunger carrying barrel 15 and the output shaft 12 and belt 11 actuated thereby. Obviously, the amount of the component of force tending to cause rotation of the barrel in the above described manner may be varied by appropriate adjustment of the cam face 27 by manipulation of the hand wheel 33 so that the speed of the motor 3 is capable of adjustment as desired. In like manner the stroke volume, i. e., displacement of pump 2 may be governed.

From the foregoing it is evident that the pump-motor transmission of my invention when constructed and arranged as described affords two alternative or supplementary expedients for controlling the speed of operation of the unit, i. e., by adjustment of either of the hand wheels 33 to regulate the angle of inclination of the cam face 27 and thrust ring 34 relative to the shaft 12. It is likewise evident that in some installations such a dual adjustment is not absolutely necessary and it may be sufficient for one of the inclined cam devices to be set up in permanently fixed relation to its shaft, in which case I prefer that the cam device for the motor 3 be the fixed one since it is preferable that the pump be always capable of a desired speed adjustment.

The advantages of the aforesaid assembly and the component parts thereof are manifold. Important among them are its simplicity, compactness, and economy of parts. The construction is substantially valveless since the admission of liquid to and discharge from the cylinders is governed simply by the registry of ports 43 with the intake and discharge passages 37, 39 and is inherently timed by the design of the ports to occur as the plungers are being retracted by springs 24 or advanced by cam 27 during the cycle. The ports 43 are automatically closed only at the stroke ends and hence no separate movable valve of any kind is necessary to effect the liquid distribution. Furthermore, I consider it specifically novel with me to employ the coil springs 22 to effect actuation of the plungers 20 on the suction stroke, thus greatly simplifying the assembly and eliminating a separate pump or pump cylinder for this function. The merit of constructing the pump and motor 2, 3 respectively of substantially identical design and operating characteristics is obvious and the fact that my system permits choice of any operating speed throughout a wide range is equally so.

In common with other hydraulic devices of the type described, my assembly is self-lubricating and not subject to becoming inoperative through accumulation of dirt or other source of deterioration arising from exposure to the atmosphere. Due to the arrangement of the plungers axially of and carried in the rotating barrel 16, the external dimensions of the pump of given rating according to my invention are much smaller than those of other rotary positive displacement pumps of similar rating.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. A hydraulic mechanism of the type described comprising a housing, a shaft journaled in the housing, and a barrel connected to the shaft thereof for rotation therewith, a cam mechanism comprising a relatively fixed surface surrounding the shaft and disposed at an angle thereto, said mechanism being rotatably journaled on an axis intersecting the shaft axis for adjustment of the inclination of said surface, said barrel having a plurality of cylinders disposed axially therein in spaced relation to the axis thereof, a plunger for each of said cylinders in operative thrust engagement with said surface, means for maintaining the operative engagement of the plungers with said surface comprising a plurality of guide pins one for each plunger, and means for coupling said pins with the plungers in fixed axial relation thereto for movement therewith as a unit, said barrel having axial recesses slidably receiving said pins, and coil springs disposed in said recesses and acting on the ends of the pins, a member in said housing having intake and discharge passages, said barrel being rotatable relative to said member and said cylinders communicating with said passages as the barrel rotates relative to the member.

2. A hydraulic mechanism of the type described comprising a housing, a shaft journaled in the housing, and a barrel connected to the shaft thereof for rotation therewith, a cam mechanism comprising a relatively fixed surface surrounding the shaft and disposed at an angle thereto, said mechanism being rotatably journaled on an axis intersecting the shaft axis for adjustment of the inclination of said surface, said barrel having a plurality of cylinders disposed axially therein in spaced relation to the axis thereof, a plunger for each of said cylinders in operative thrust engagement with said surface, means for maintaining the operative engagement of the plungers with said surface comprising means slidably carried and axially guided by the barrel and connected to the plungers in fixed axial relation thereto for movement therewith as a unit, and spring means acting on said last named means, and a member in said housing having intake and discharge passages, said barrel being rotatable relative to said member and said cylinders communicating with said passages as the barrel rotates relative to the member.

3. A hydraulic power transmitting device comprising a housing, a shaft rotatably mounted in the housing, a barrel connected to the shaft for rotation therewith, said barrel having a plurality of axially disposed cylinders therein, a plunger axially reciprocable in each of said cylinders, an annular cam member having diametrically disposed trunnions rotatably journaled in the housing with the axis thereof intersecting the shaft axis and an inclined cam surface adapted to have its angle of inclination relative to the shaft adjusted by adjustment of the member about said trunnions, means for effecting said last named adjustment from the exterior of the housing, said plungers having end thrust engagement with said surface, resilient means carried by the barrel for maintaining said engagement comprising a guide pin for each of said plungers coupled in fixed axial relation thereto for movement therewith as a unit, said barrel having axially disposed recesses slidably receiving and axially guiding said pins, and coil springs disposed in said recesses in resilient end thrust engagement with said pins, a fixed member disposed concentrically of said barrel and housing and having feed and discharge passages therein, said barrel being rotatable relative to said member and each of said cylinders communicating with said passages alternately as the barrel rotates, liquid entering the cylinders through said intake passage in one direction of movement of the plungers and discharging through the discharge passage in the opposite direction of their movement.

4. A hydraulic mechanism of the type described comprising a housing, a shaft journaled in the housing, and a barrel connected to the shaft thereof for rotation therewith, a cam mechanism comprising a relatively fixed surface surrounding the shaft and disposed at an angle thereto, said mechanism being rotatably journaled on an axis intersecting the shaft axis for adjustment of the inclination of said surface, said barrel having a plurality of cylinders disposed axially therein in spaced relation to the axis thereof, a plunger for each of said cylinders in operative thrust engagement with said surface, means for maintaining the operative engagement of the plungers with said surface, comprising means slidably carried and axially guided by the barrel and connected to the plungers for movement therewith as a unit, and spring means acting on said last named means, and a member in said housing having intake and discharge passages, said barrel being rotatable relative to said member and said cylinders communicating with said passages as the barrel rotates relative to the member.

EUGENE HIGGINS.